Patented Sept. 9, 1930

1,775,477

UNITED STATES PATENT OFFICE

FRITZ STRAUB, OF BASEL, SWITZERLAND, ASSIGNOR TO SOCIETY OF CHEMICAL INDUSTRY IN BASLE, OF BASEL, SWITZERLAND

DYESTUFFS CONTAINING CHROMIUM AND PROCESS OF MAKING SAME

No Drawing. Application filed September 17, 1928, Serial No. 306,618, and in Switzerland September 23, 1927.

The present invention relates to the manufacture of valuable new dyestuffs containing chromium. It comprises the process of making these new dyestuffs, the dyestuffs themselves, and the material that has been dyed with the new dyestuffs.

The invention consists in carefully treating with a reducing agent a nitrosation product of a chromium compound of the dyestuff made from diazotized 1-amino-2-hydroxynaphthalene-4-sulfonic acid and α-naphthol said dyestuff having the formula

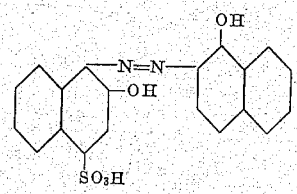

The new products thus obtained form black-blue powders which are somewhat easily soluble in water to a green-blue solution, dissolving in caustic soda solution to a pure blue solution, and dyeing wool and silk steel-blue tints of excellent properties of fastness. They may also be used for coloring varnishes and other materials, as well as the manufacture of further dyestuffs.

The following example illustrates the invention, the parts being by weight.

Example

The dyestuff made in known manner from 39.4 parts of the azo-dyestuffs from diazotized 1-amino-2-hydroxynaphthalene-4-sulfonic acid and α-naphthol of the formula

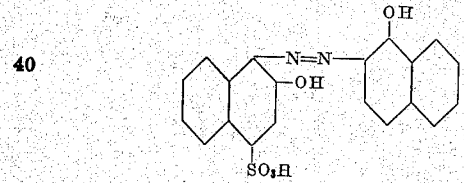

by successive chroming with alkali chromite and nitrosation are dissolved in 500 parts of water and 25 parts of caustic soda solution of 36° Bé. and to the solution are added at 40° C. 56 parts of crystallized sodium sulfide. The whole is slowly warmed, whereby the red-blue color of the solution is changed towards pure blue. Stirring is continued, while cautiously heating, until the sodium sulfide has disappeared as determined by test. After neutralization by acetic acid the dyestuff is salted out at 60° C., filtered, pressed and dried. It is a black-blue powder which is somewhat easily soluble in water to a green-blue solution, and dissolves in caustic soda solution to a pure blue solution; it dyes wool and silk steel-blue tints of excellent properties of fastness.

Similar products are obtained with the chromium compounds which may be made with other chroming agents, such as chromium fluoride or chrome acetate, or by substituting other agents acting similarly for the alkali sulfide, such as alkali sulfhydrate, alkali polysulfide, ferrous hydroxide, glucose, and the like.

What I claim is:—

1. A process for the manufacture of new dyestuffs by carefully treating with a reducing agent a product of the nitrosation of a chromium compound of the dyestuff from diazotized 1-amino-2-hydroxynaphthalene-4-sulfonic acid and α-naphthol said dyestuff having the formula

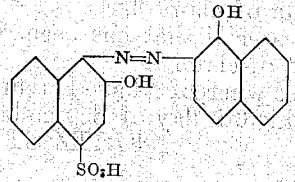

2. A process for the manufacture of new dyestuffs by carefully treating with sodium sulfide a product of the nitrosation of a chromium compound of the dyestuff from diazotized 1-amino-2-hydroxynaphthalene-4-sulfonic acid and α-naphthol said dyestuff having the formula

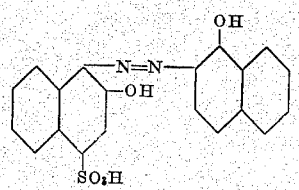

3. As new dyestuffs the products obtained by carefully treating with a reducing agent a product of the nitrosation of a chromium compound of the azo-dyestuff from diazotized 1-amino-2-hydroxynaphthalene-4-sulfonic acid and α-naphthol said azo-dyestuff having the formula

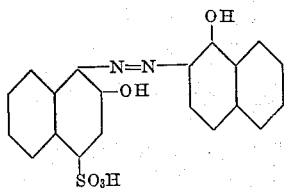

which products form black-blue powders which are somewhat easily soluble in water to a green-blue solution, dissolving in caustic soda solution to a pure blue solution, and dyeing wool and silk steel-blue tints of excellent properties of fastness.

4. As a new dyestuff the product obtained by carefully treating with a reducing agent the product of the nitrosation of the chromium compound of the azo-dyestuff from diazotized 1-amino-2-hydroxynaphthalene-4-sulfonic acid and α-naphthol said azo-dyestuff having the formula

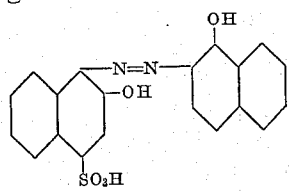

made by means of alkali chromite, which product forms a black-blue powder which is somewhat easily soluble in water to a green-blue solution, dissolving in caustic soda solution to a pure blue solution, and dyeing wool and silk steel-blue tints of excellent properties of fastness.

5. The material that has been dyed with the products of claim 3.

6. The material that has been dyed with the product of claim 4.

In witness whereof I have hereunto signed my name this 6th day of September 1928.

FRITZ STRAUB.